No. 647,148. Patented Apr. 10, 1900.
F. MYERS.
CAR WHEEL AND AXLE.
(Application filed Sept. 21, 1899.)
(No Model.)
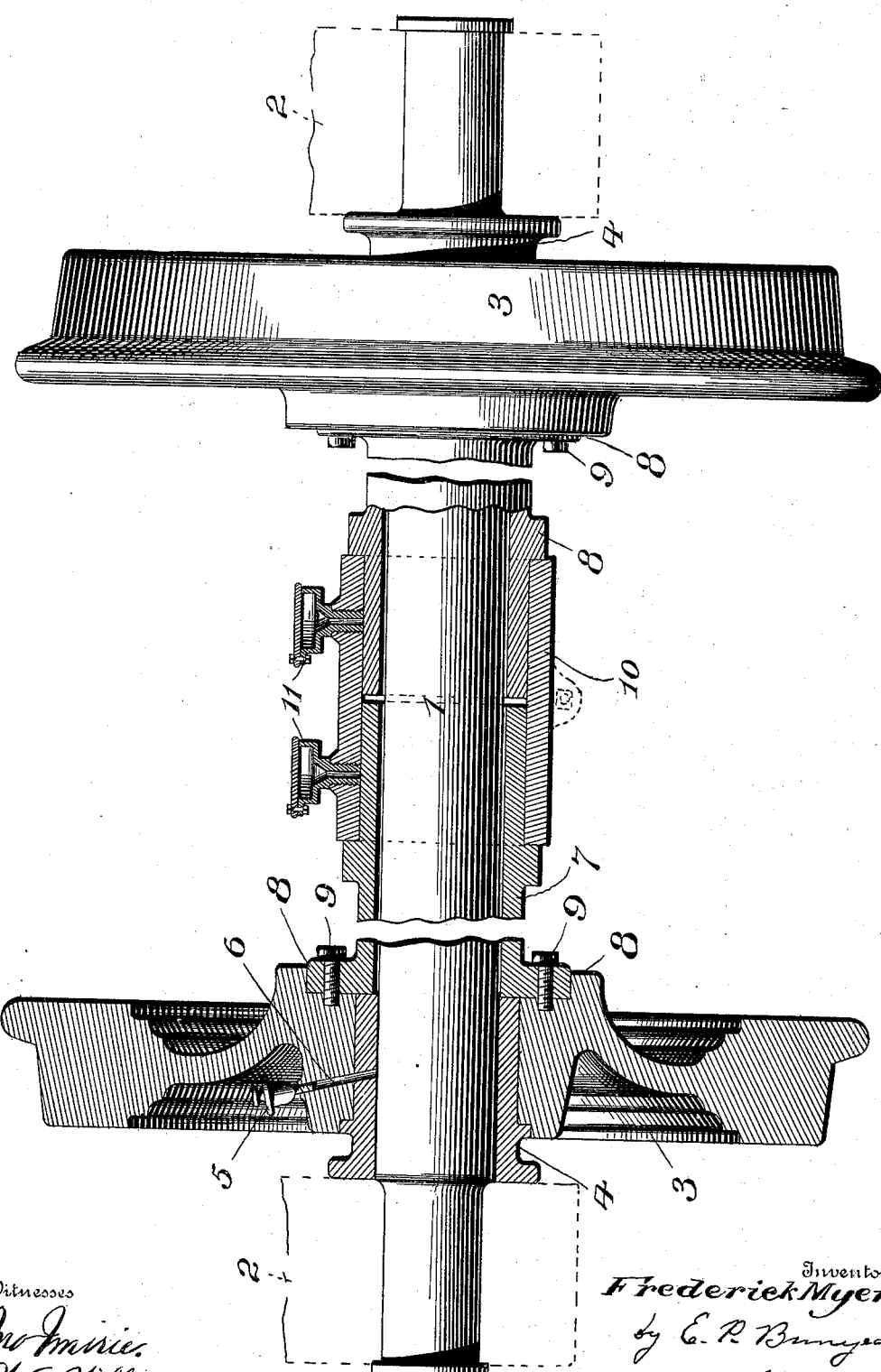
Witnesses
Jno Imirie
W. A. Williams
Inventor
Frederick Myers.
by E. P. Bunyea
his Attorney

UNITED STATES PATENT OFFICE.

FREDERICK MYERS, OF NEW YORK, N. Y.

CAR WHEEL AND AXLE.

SPECIFICATION forming part of Letters Patent No. 647,148, dated April 10, 1900.

Application filed September 21, 1899. Serial No. 731,142. (No model.)

*To all whom it may concern:*

Be it known that I, FREDERICK MYERS, a citizen of the United States, residing at New York city, in the county of New York and State of New York, have invented certain new and useful Improvements in Car Wheels and Axles; and I do declare the following to be a full, clear, and exact description of the invention, such as will enable others skilled in the art to which it appertains to make and use the same, reference being had to the accompanying drawings, and to the figures of reference marked thereon, which form a part of this specification.
My present invention relates to car wheels and axles; and one object of the same is to produce an axle which will permit the wheels at the ends thereof to revolve independently of the axle or in unison therewith and at the same time which will permit independent and separate revolution of each wheel in rounding curves.

Another object is to provide an axle which will under normal conditions revolve in unison with the wheels, but which will in case of undue friction caused by improperly-lubricated journals or resulting from other causes remain stationary, or practically so, while the wheels will revolve either in unison on a straight track or independently on a curved track until such time as the axle resumes its normal conditions or has been relubricated.

It is a well-known fact that much annoyance has been caused by hot journals, especially in long runs, and this defect can only be remedied at properly-appointed intervals during the run.

One of the objects of my invention is to provide means whereby the wheels may revolve independently of the axle in case a hot journal is developed until such time as the journal may be repaired or until it becomes cool by inaction, when it may again revolve and carry the wheels in unison therewith, the wheels in the meantime while the axle is stationary being permitted to revolve either in unison on a straight track or independently at different rates of revolution for traversing curved portions of the track.
With these ends in view my invention contemplates simple and efficient means for providing automatically shiftable or interchangeable bearing-points for the rolling-stock of a car, and the means whereby these bearing-points are rendered dependent upon the variable degree of friction developed to alternately throw them into or out of actual operation, and at the same time I provide for the independent action of the wheels in rounding curves.

In an invention of this character some latitude as to the matter of detail construction is necessary, provided material departure from the spirit of the invention is not resorted to, and with this point in view the accompanying drawing, which forms a part of this specification, shows but one form of construction which I may adopt.

In the drawing the figure illustrates a longitudinal sectional view of an axle and pair of wheels made in accordance with my invention.

The axle is designated by the numeral 1. This axle may be of the usual or any well-known form and may be journaled in boxes 2 of ordinary construction.

The wheels 3 are fitted with bushings 4, which are preferably formed of phosphor-bronze and may be conveniently held in place by shrinking the wheels thereon, although other means may be resorted to with a view to making the bushings a rigid and immovable part of the wheel. An oil-cup 5 is mounted upon the hub of each wheel, and an oil-duct 6 extends from the mouth of the oil-cup through the hub and bushing to the axle. This oil-cup is disposed at an angle to the axle in order that it may be easily removed and replaced. The bushings 4 are accurately fitted to the axle 1, so that under normal conditions the wheels revolve with said axle; but should sufficient friction be caused by lack of proper lubrication in the journal-boxes 2 to overcome the friction exerted at the bearing-point of the bushings 4 the axle may remain stationary and the wheels and bushings will revolve about the axle.

In order that the wheels may revolve independently to round curves, I provide sleeves 7, having flanges 8. The outer flanges are bolted to the wheels, as at 9, and the inner ends of said sleeves extend substantially to the center of the axle, at which point a clamp or cuff 10 surrounds the meeting ends of the sleeves 7. This clamp or cuff 10 may be provided with binding-screws, which may be turned or set to give just the required degree of stress to insure the wheels unitary revolution on a straight track and permit independent revolution on a curved track or to take up wear of the parts.

Oil-cups 11 of any suitable construction may be mounted upon the clamp or cuff to communicate with an oil-duct extending to the ends of the sleeves.

It will be noticed that the inner surface of the sleeve 7 does not contact with the outer surface of the axle and that the points of bearing are either at the axle-boxes or upon the bushings, dependent upon which point the friction is greater. It is also to be noted that under either condition referred to the wheels may revolve independently of the axle or independently of each other at different rates of speed in rounding curves.

What I claim is—

1. A car-axle comprising hollow axle-sections having flanges at their outer ends, car-wheels bolted to the flanges, a central collar surrounding the inner meeting ends of the hollow axle-sections, a solid axle extending through the hollow sections out of contact therewith, said solid axle being journaled at its ends to bearings on the car, and bushings fitted within the wheels and bearing frictionally upon the solid axle, substantially as described.

2. A car-axle consisting of hollow axle-sections secured at their outer ends to separate wheels, a collar surrounding the inner meeting ends of said hollow sections, a solid axle passing through the hollow sections out of contact therewith, and journaled at its ends to bearings on the car, bushings secured in the wheels and frictionally connected with said solid axle, and an oil-cup mounted in an oil-duct passing diagonally through each wheel-hub and leading to the solid axle, substantially as described.

In testimony whereof I have affixed my signature in presence of two witnesses.

FREDERICK MYERS.

Witnesses:
J. C. QUADE,
E. A. PAUL.